Figure 1:
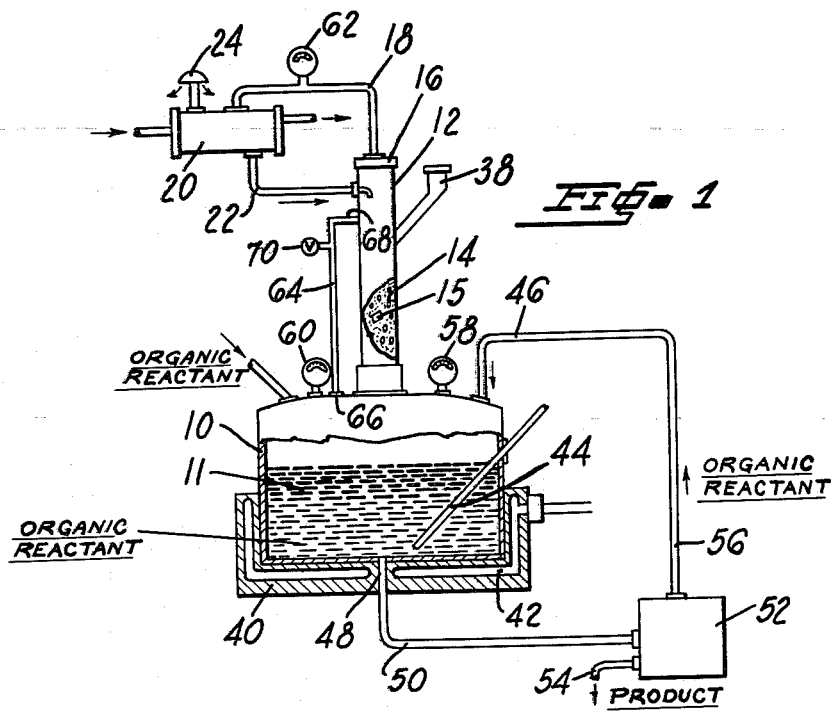

June 18, 1963 R. S. TOWERS 3,094,546
PROCESSES FOR PREPARING ORGANO-METALLIC COMPOUNDS
Filed July 14, 1960

INVENTOR.
RUSSELL S. TOWERS
BY John A. Young
ATTORNEY

United States Patent Office 3,094,546
Patented June 18, 1963

3,094,546
PROCESSES FOR PREPARING ORGANO-
METALLIC COMPOUNDS
Russell Smith Towers, Adrian, Mich., assignor to Stauffer
Chemical Company, Adrian, Mich.
Filed July 14, 1960, Ser. No. 42,865
12 Claims. (Cl. 260—448)

This invention relates to processes for preparing organo-metallic compounds and more specifically to organo-metallic compounds of the alkoxide and metal alkyl types.

The present invention is related to co-pending application No. 698,821 by Amos R. Anderson and William Smith filed November 25, 1957, and is intended as an improvement over the processes of that application. The general principles of synthesis disclosed in Application No. 698,821, now U.S. Patent No. 2,965,663, issued December 20, 1960, are also employed in the present invention.

Although the Smith-Anderson process has been quite successful in the preparation of numerous alkoxide compounds and metal alkyl compounds such as aluminum isopropoxide, and butyl lithium, the processes tend to become less suitable where the exothermic heats of reaction are so high that melting of the metal packing from the heat of reaction is encountered.

Unlike previous methods of synthesizing organo-metallic compounds, the Smith-Anderson process utilizes the basic principle of isolating the liquid phase organic material reactant and the solid phase metal reactant which is formed as a packing and then heating the organic-reactant to generate a continuous flow of vapor phase organic reactant which is passed through the packing for reaction therewith. Unreacted vapor phase organic reactant is then condensed and refluxed through the packing to remove the reaction product, the rate of reaction being controlled by the rate of generating the vapor phase flow which in turn is regulated by the amount of heating performed on the liquid phase organic reactant. The present invention proposes an even further development to this unique means of synthesis by diverting a portion of the vapor phase flow and conducting such diverted flow to a point of entry into said packing which is removed from the point of entry for the other portion of the vapor phase flow. By following this additional procedure, it is possible to regulate the two flows so that they are related one to the other as a function of the pressure drop between their respective points of entry. This means that if the diverted flow is closer to the condenser, then as the pressure drop increases because of build-up of reaction product or impedence for any reason, the rate of reflux of liquid phase organic reactant through the packing will increase automatically to remove the reaction product and will therefore automatically reduce the rate of production of reaction product within the packing. Because an increase in pressure drop of the vapor phase flow increases the proportion of diverted flow, then the appropriate rate of producing reaction product within the packing is at all times automatically assured.

Thus, one of the important objects of the present invention is realized which is to practice the Smith-Anderson process and improve it against the possibility of clogging the metal reactant packing with reaction product.

Another major significance of separating at least a portion of the vapor phase flow of organic reactant and diverting it from the other portion of the vapor phase flow as described, is that it provides a further control parameter by which reaction conditions within the packing can be closely regulated and thereby further increasing the utility of the Smith-Anderson process. To illustrate, a greater or smaller proportion of the diverted flow which is located to bypass a portion of the packing, will determine the concentration of vapor phase organic reactant within the packing at any one time, and thus, the diverted flow can be increased to proportionately increase the refluxing liquid phase of organic reactant passing countercurrently through the packing to attain more efficient removal of reaction product and thus provide cleaner surfaces of the metal packing which are thereby rendered more reactive to the vapor phase organic reactant. It is thus possible to achieve a second object of the invention which is to obtain additional control over temperature, pressure, and rate of reaction generally within the packing according to the process taught by Smith-Anderson. The greater precision of control also makes it possible to handle reactions which involve greater exothermic heat.

Additional objects of the invention include greater control against flooding of the metal packing; more uniform consumption of the metal reactant packing, for example where the metal packing is provided in the form of a column the metal is reacted simultaneously at both the top and bottom of the column, hence more uniform consumption of the metal package is effected; and the present invention also makes practical the addition of a secondary organic material which is vaporized with the organic reactant and functions to remove the reaction product more efficiently.

Figure 2:
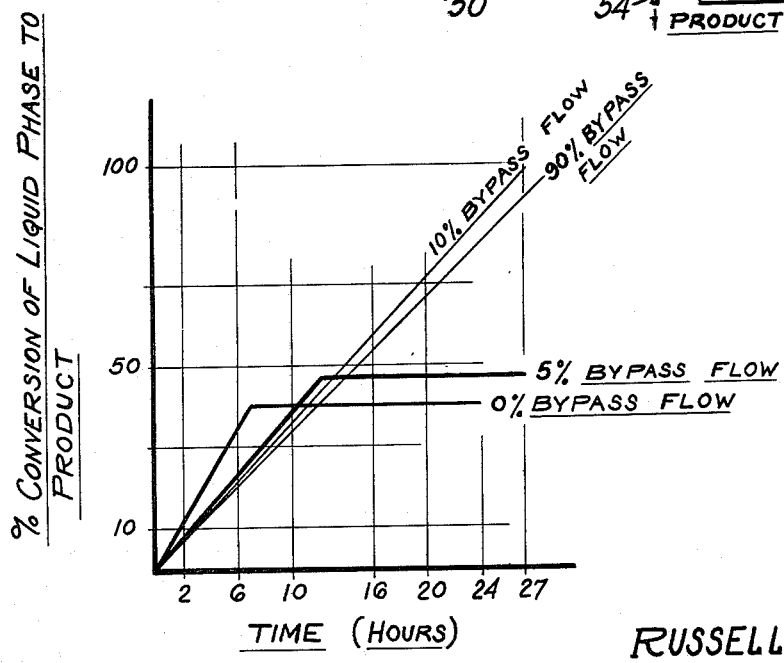

Other objects and features of the invention will become more apparent from a consideration of the following description which proceeds with reference to the accompanying drawing wherein:

FIG. 1 is a schematic drawing of an apparatus which is adapted for practicing the processes of the present invention; and, FIG. 2 is a qualitative graph plotting Percent Conversion of Liquid Phase to Product versus Time (in hours), to illustrate the rate of production of reaction product, the various curves illustrating qualitatively by their slope how the rate can be affected depending upon the percent diversion of the vapor phase.

Referring now to FIGURE 1, there is shown the apparatus which includes all of the features of safety in operation, greater productivity and embodying generally all of the advantages found in the Smith-Anderson apparatus. The apparatus includes a reaction vat 10 containing a charge of liquid phase organic reactant 11 and a column 12 having a packing 14 of solid phase metal reactant 15, the metal reactant 15 being provided in the form of particles which can vary considerably in size, the only requirement being that countercurrent flow is permitted of gaseous phase reactant upwardly and liquid phase refluxing flow (together with reaction product) downwardly within the column 12. Another factor which is considered, regarding particle size of the packing, is the total area of metal reactant which influences the rate of production of reaction product within the column 12. As will be seen, the choice of particle size for the metal packing is selected on the basis of the particular synthesis reaction. It will also be understood that the packing need not be continuous but can be supported on perforated plates or the like at various vertical locations within the column 12, the important consideration being that the liquid phase organic reactant 11 be isolated from the packing 14 which is accessible to the liquid phase reactant 11 only when the liquid phase is first vaporized.

At the top 16 of the column 12 there is a line 18 leading to condenser 20 where unreacted vapor phase reactant which leaves the column 12 is condensed and then returned through line 22 for refluxing through the packing 14. Within the column synthesis reaction takes place which, in the case of production of metal alkoxide causes hydrogen gas to be produced as a by-product. The condenser 16 may include a vent 24 which releases such hydrogen to atmosphere. As a result, there is no superatmospheric pressure of any significance within the apparatus, the venting being a simple liberation of hydrogen to atmosphere. Thus, no hazards of explosions are encountered during the reaction.

If desired, column 12 can be provided with a chute inlet 38 by which solid phase metal reactant can be fed into the column as required. The chute is of course closed during operation to prevent loss of vapor phase reactant. The vat or vessel 10 is surrounded by a jacket 40 which is heated in some suitable manner, as by steam lines, 42 to provide the necessary heat for vaporizing the liquid phase charge 11; and, means can also be further provided if desired for stirring the contents of the vessel 10 as illustrated by 44. The liquid phase reactant 11 can be fed either continuously or intermittently through an inlet line labelled "Organic Reactant" and the contents of the vessel 10 can be either continuously or intermittently withdrawn through discharge opening 48 at the base of the vessel 10 through an outlet line 50 and removed to a separator 52 at which the product is discharged through line 54 and the unreacted liquid phase material returned to the vesesl through line 56.

Temperature and pressure indicating devices 58 and 60 provide information as to conditions within the vessel 10 and a pressure indicating device 62 may be provided in line 18 to illustrate the pressure at the upper portion of the apparatus.

Thus far, the apparatus is essentially the same as shown in the Smith-Anderson disclosure. To this apparatus, however, I include a by-pass line 64 connected with the vessel 10 at 66 to divert a portion of the vapor phase flow which is continuously generated from the liquid phase, and to conduct such vapor phase flow to the point of entry 68 with the column 12, thereby bypassing the major portion of the packing 14. The line 64 includes a valve 70 to regulate the amount of diverted vapor phase flow through line 64 and a pressure gauge (not shown) may further be included to indicate the pressure differential between 68 and the interior of vessel 10, the latter pressure being indicated by gauge 60. It will be understood that a number of bypas lines 64 of different diameters may be provided in place of a single bypass line 64 and the point of entry 68 need not be at the uppermost part of the packing 14 but can, if desired, terminate at whatever height of the column 12 is desired so that the bypass flow enters the packing at the uppermost or some intermediate height of the packing 14. It is necessary, however, that the points of entry for the distinct vapor phase flows be at separated points in relation to the packing 14.

For purposes of illustration, assume that the product to be produced is aluminum tri n-butoxide. Butanol is charged to the vesesl 10 through inlet labelled "Organic Reactant" and subdivided aluminum is fed through chute 38 to form a packing 14 within the column 12. The size of the aluminum which is suitable for this purpose is generally within a size range of about three mesh particles, the particular size not being critical except that liquid phase n-butanol must be permitted to travel upwardly through the column 12 and unreacted vapor phase n-butanol must be passable, as a liquid phase reflux, downwardly through the packing 14, the reaction product aluminum tri n-butoxide being likewise removable from the tower 12 with the refluxing butanol for entry into the vessel 10. Heating commences at a controlled rate by introducing steam within steam lines 42 of the jacket 40 and a continuous vapor phase flow is generated, one portion of the flow being directed upwardly from the base of the column 12 where it enters the packing 14 at its lowermost portion and commences to travel upwardly as a vapor phase and the other portion travelling as a bypass through bypass line 64. As the described vapor phase travels upwardly past the surfaces of the aluminum particles it reacts with the aluminum to form aluminum tri-n-butoxide.

Visual observations into the interior of the column substantiate that the alcohol in vapor phase is reactive with the aluminum and buildup of product on the surface of the aluminum can be seen. Any unreacted vapor phase n-butanol passing upwardly through the packing from the base of the column 12 emerges at the top portion of the packing and is fed through line 18 to the condenser 20 where it is condensed and then returned in its liquid phase form through line 22 for refluxing through column 14 as a countercurrent flow to the rising vapor phase n-butanol. The bypass flow from line 64, also unreacted in column 2, is condensed in condenser 20 and refluxed through the column 12. The refluxing liquid phase n-butanol washes the reaction product aluminum tri n-butoxide from the surface of the aluminum causing it to flow into the vessel 10 with the refluxed n-butanol so that with passage of time, the original charge of liquid phase 11 becomes more concentrated in reaction product and less concentrated in unreacted n-butanol which diminishes by its vaporization, passage to the packing 14 and subsequent reaction or refluxing. The reaction occurs without the necessity for catalysis of any type; gentle refluxing is all that is necessary to initiate the reaction and the rate of production of aluminum tri n-butoxide is then simply a function of the amount of heating to determine the rate of production of vapor phase flow upwardly through the packing 14.

About 50% of the n-butanol which is volatilized is diverted through the bypass line 64 for entry to the column 12 at 68, the amount of bypass being determined by operation of the valve 70. Let it be assumed, at the beginning of operation, that the valve 70 is set so that an amount of say 50 percent of the vapor phase flow is diverted to enter column 12 at 68 this being at the uppermost part of the packing 14. The vapor phase flow which enters at 68, is subjected less to exposure with aluminum surfaces of the packing 14 and hence, a greater portion of it passes through line 18 to the condenser 20 and is refluxed as liquid phase countercurrently through the packing 14. Thus, a smaller proportion of the diverted flow is reacted with the metal packing than is the flow starting from the base of the packing and it is therefore possible to regulate the rate of production of product by setting the valve 70 so that a higher or lower proportion of the total vapor phase flow is caused to pass though the entirety of the packing 14. The significance and function of the bypass line 70 is that it provides greater degree of control over the rate of production of product within the packing 14 and thereby controls the temperature within the packing 14. Thus, referring to FIGURE 2, it will be seen that the slopes of the various curves represent the rate of production of aluminum tri n-butoxide and the slope can be unbroken by a plateau if sufficient bypass flow is provided to ensure adequate removal of reaction product precluding clogging of the packing. The important function of the diverted flow is that such diverted flow is refluxed almost entirely and thus increases the amount of countercurrent liquid phase flow of n-butanol to remove the aluminum tri n-butoxide from the surface of the aluminum particles, and thereby presenting fresher unreacted surfaces of aluminum which are available for the upcoming vapors of butanol which enter from the base of the packing 14.

It is important to the process described that the packing 14 not become clogged with reaction product, this possibility being due to the accumulation of reaction product on the surface of the aluminum particles to impede vapor phase passage upwardly through the packing 14. This is caused by an inadequacy of the reflux flow. Such possibilities of clogging of the packing 14 are obviated by self-regulation in the present invention by means of the diverted vapor phase flow of n-butanol through line 64, and the correction is achieved by the mechanism of self-embodied regulation. For example, should any clogging of the packing 14 be incipient, there is produced a greater pressure drop between the point of entry of vapor phase at the bottom of the packing 14 and at the point of entry 68 for the bypass flow 64, and this increase of pressure drop produces a proportionately greater bypass flow in line 64 and a resulting increase in rate of reflux flow to clear the packing 14 of build-up reaction product. Once the increased reflux clears the packing the pressure drop returns to normal thereby re-establishing the proper proportion of flow in bypass line 64 and that travelling upwardly from the base of packing 14. Another important significance of the bypass flow of n-butanol is that should flooding start to occur in the bottom portion of the packing 14, this will likewise produce a greater pressure drop between the base 14 of the packing and entry point 68 and produce a greater reflux flow downwardly from the top of the column 12 and the greater pressure at the top of the column 12 will act as a hydraulic column suppressing flooding within packing 14.

Another important aspect of the bypass line 64 is that since the vapor phase concentration is the greatest at the base of the packing 14 the rate of production of aluminum tri n-butoxide is greatest at the bottom of the packing 14 and the rate of production of alkoxide decreases progressively with increase of column height because of the successively leaner concentration of vapor phase n-butanol progressing upwardly through the packing 14. The result of this is that the aluminum is attacked to a greater extent at the bottom of the packing and hence the particle size of aluminum is smallest at the bottom of the packing 14 and the column acting under its own weight tends to pack the particles tightly together at the base of the packing 14 and obstructs the passage of vapor phase therethrough. Because of the introduction of vapor phase n-butanol at both the top and bottom of the packing in the present invention, the problem described is greatly relieved.

Should the refluxing ever become inadequate to remove reaction product so that clogging ensues, the build-up of reaction product ceases in accordance with the curve labelled 0% bypass. Interpreting this family of curves labelled 0, 10, 20 . . . 90% bypass, it will be seen that the ideal reaction condition is one in which sufficient vapor phase bypass is provided to ensure a reflux rate sufficient to remove the reaction product and preclude clogging of the packing.

Another important feature of the invention will become apparent from the next example of embodiment, which involves a synthesis having a high exothermic reaction. An example of this is the synthesis of sodium ethoxide according to the following equation:

$$2Na+2CH_3-CH_2OH \rightarrow 2Na(OCH_2CH_3)+H_2$$

In this reaction, as in all the synthesis reactions of the Smith-Anderson type, the organic liquid phase material must be vaporizable at a temperature below the melting point of the solid metal phase, otherwise in the process of heating to provide a continuous vapor phase flow to the packing, the metal will melt or coalesce to prevent passage of vapor phase and liquid phase reactant through the packing. It is also important that the reaction not proceed so quickly within the packing that excessive liberated heat from the exothermic reaction will produce melting of the packing. With reference to FIGURE 2, it will be seen that by means of the bypass flow and regulating the percent of bypass for the phase it is possible to regulate the rate of production of reaction product within the packing and hence the process is made more suitable for highly exothermic reactions such as the one listed. Another control means is the rate of heating the liquid phase material in vessel 10 to control the total generation of vapor phase flow. This regulation, in addition to the control of bypass flow makes the Smith-Anderson principle of synthesis even more versatile for highly exothermic alkoxidation reactions.

The advantages of the present invention are also made apparent in the preparation of metal alkyls in which salt is one of the reaction products. The salt by-product tends to clog the packing and presents special problems of removal.

An example is the synthesis of n-butyl lithium according to the following reaction:

$$CH_3-CH_2CH_2CH_2-Cl+2Li \rightarrow CH_3CH_2CH_2CH_2Li+LiCl$$

In this reaction it will be noted that lithium chloride is one of the reaction products and is precipitated as a salt so that during the reaction the accretion or build-up of salt within the packing tends to obstruct the upcoming vapors of n-butyl chloride but in the present invention, by means of the bypass vapor phase, n-butyl chloride, there is set up a faster reflux rate to wash out the reaction product n-butyl lithium and lithium chloride with the reflux liquid phase flow so as to keep the packing relatively free of reaction product and thereby prevent clogging. Depending upon the rate of production of product and build-up of salt, it is easily possible to determine the proper percentage of bypass flow to assure constant removal of reaction products from the packing so that it will not interfere with the reaction.

A further feature of the invention is that it makes possible the inclusion with the liquid phase reactant of a non-reactive vaporizable organic material which does not combine with the metal packing but may be included for the function of controlling the rate of formation of reaction product within the packing and also assisting in removal of the reaction product from the packing. For example, in the production of aluminum methoxide in accordance with the following reaction:

$$6CH_3OH+2Al \rightarrow 2Al(CH_3O)_3+3H_2$$

In this reaction, owing to the highly exothermic nature of the reaction and the need to control the rate of producion of product to keep the aluminum from melting, it is my practice to include an inert organic material such as hexane with the original charge of methanol in the vessel 12, and then control the rate of production of vapor phase by controlled heating of the vessel. A further control is by determining the percent of bypass flow as described. As the methanol vapor is passed upwardly through the packing and refluxed, there is an accompanying vapor phase and liquid phase reflux flow of hexane which assists in abstracting heat from within the packing and since the hexane is substantially unreactive with the aluminum packing it in no way interferes with the alkoxidation reaction. The reaction product, aluminum trimethoxide is soluble in the liquid phase refluxing hexane which insures removal of the reaction product from the packing. Inclusion of the hexane in this case makes for a more efficient overall reaction because the metal packing is made freer of reaction product and hence is more in condition for reaction with the vapor phase methanol. Also, the refluxing hexane serves the function of abstracting heat within the packing so that the reaction is more conrollable.

From the following additional examples of the invention, it will be apparent that the present invention may employ metals generally from groups IA, IIA, and IIIA, having a particle size providing for countercurrent gaseous and liquid flow therein. In the case of formation of alkoxides the liquid phase alcohol is not limited by any consideration except that it be reactive with the metal and be vaporizable at a temperature below the melting point of the metal. Other than these considerations, there is no limit to the suitability of the described process for synthesizing alcoholates.

In the case of metal alkyls, the same considerations apply, i.e., the alkyl halide must be vaporizable at a temperature below the melting point of the metal packing, the metal packing is of particle size large enough to provide vapor phase and countercurrent liquid phase flow within the packing, and the bypass flow is in such percent that heat of reaction is removed quantitatively to preclude melting from the exothermic heat of reaction normally involved in these syntheses. The final consideration is that the refluxing also be at such rate as to remove both the reaction product and the salt which is formed as a by-product so that the packing will not be clogged.

From the following varied examples, which include the composition of metal and alkyl halide starting materials it will be understood that these are only examples of synthesis reactions which fill the foregoing general requirements, and that the invention is by no means limited to these examples which only serve as illustrations of typical suitable reactions.

necessary and in some instances it is recommended that the packing be filled with a protective atmosphere to prevent degeneration of the metal packing where the metal packing requires this added protection. For example, with lithium and sodium packing, a protective atmosphere of nitrogen gas or the like is recommended.

While the production of alcoholates and metal alkyls are those with which we have found that the invention has its most apparent utility, it will be apparent that the invention is also suitable for the synthesis of Grignard reagent and is obviously suggested from the disclosed examples.

It is intended that such variations, revisions and ap-

METAL ALKYL SYNTHESIS

| Example | Organic reactant | Metal reactant | Packing size | Diluent | Product amount | Approx. by-pass flow, percent | Time period, hours | Yield |
|---|---|---|---|---|---|---|---|---|
| (1) N-butyl lithium | N-butyl chloride | Lithium | ¾ inch cubes | 50-50 N-hexane N-heptane (1 gal.) | 1 lb | 80 | 12 | 60% (based on butyl chloride), 75% (based on lithium). |
| (2) N-amyl lithium | N-amyl chloride | do | do | N-heptane | 30 grams | 50 | 2 | 60% (based on amyl chloride), 70% (based on lithium). |

GRIGNARD SYNTHESIS

| Example | Organic reactant | Metal reactant | Packing size | Diluent | Product amount | Approx. by-pass flow, percent | Time period, hours | Yield |
|---|---|---|---|---|---|---|---|---|
| (1) N-propyl magnesium bromide | N-propyl bromide | Magnesium | Standard turnings | Tetrahydrofuran | 5/100 mol | 80 | 3 | 50%. |
| (2) N-butyl magnesium chloride | N-butyl chloride | do | do | do | 3/100 mol | 80 | 3 | 30%. |

METAL ALKOXIDE SYNTHESIS

| Example | Organic reactant | Metal reactant | Packing size | Diluent | Product amount | Approx. by-pass flow, percent | Time period, hours | Yield |
|---|---|---|---|---|---|---|---|---|
| (1) Magnesium methylate | Methanol | Magnesium | ¾ inch cubes | None | 100 grams | 90 | 4 | Quant. |
| (2) Calcium methylate | do | Calcium carbide | ¼ inch cubes | do | 40 grams | 90 | 2 | 98.6%. |
| (3) Sodium methylate | do | Sodium | ½ inch cubes | do | 47 grams | 80 | 2 | Quant. |
| (4) Sodium ethylate | Ethanol | do | do | n Hexane | 95 grams | 90 | 2 | Quant. |
| (5) Lithium ethylate | do | Lithium | do | do | | 50 | 2 | Quant. |
| (6) Lithium t-butoxide | t-Butanol | do | do | None | 51 grams | 90 | 2 | Quant. |
| (7) Aluminum methylate | Methanol | Aluminum | ⅛″ x ⅛″ x 1″ strips. | do | 102 grams | 90 | 2½ | Quant. |
| (8) Aluminum ethylate | Ethanol | do | do | do | 60 grams | 90 | 3 | Quant. |
| (9) t-Butoxide aluminum | t-Butanol | do | do | do | 20 grams | 90 | 20 | Quant. |

Once the upcoming vapor phase reactant saturates the solid phase packing, the reaction rate is not appreciably increased by increasing the percent of vapor phase concentration within the packing. Thus, changing the upcoming vapor phase flow from say 15% to a greater percent will not greatly affect the rate of production of reaction product, and in fact, may reduce the rate of production of reaction product should clogging occur. The rate of producing reaction product is most greatly affected by the size of the metallic particles, the general relation being, the smaller the metallic particles the faster the rate of producing reaction product. In the case of smaller particles, care must be taken to increase bypass flow to remove the reaction product at a sufficient rate to preclude clogging.

In some reactions of the alkylation type, there is a tendency to link the metal alkyl reaction products RM with the alkyl halide RX to produce a larger organic compound. Thus:

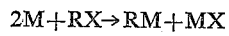

from which

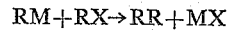

This latter reaction being suppressed by reducing the temperature of heating the organic reactant. This is achieved by developing subatmosphere pressure within the packing and thereby reducing the temperature required for vaporizing the organic reactant.

In the case of production of metal alkyls, where there is no gaseous by-product, venting to atmosphere is unplications of the invention as are reasonably to be expected from those skilled in the art and which incorporate the herein disclosed principles will be included within the scope of the following claims as equivalents of the invention.

What is claimed is:

1. A process for producing metal alkyl and metal alkoxide compounds by a self-regulated procedure, comprising the steps of: forming a packing of solid phase metals selected from the group consisting of metals of groups IA, IIA and IIIA and having a particle size providing liquid and vapor phase passage through said packing, locating a quantity of vaporizable liquid phase material at the base of said packing selected from the group consisting of alcohol and alkyl halide in separated relation from said packing and having a boiling point below the melting point of said packing, heating said liquid phase material to its vaporization temperature and forming a continuous vapor phase flow from continuous fractional vaporization of said liquid phase material, conducting one portion of vapor phase material flow through said packing to effect at least partial reaction with said packing, conducting another portion of said vapor phase flow as a bypass flow to enter said packing at a location above the point of entry of said first-mentioned vapor phase flow into said packing, and condensing and refluxing unreacted vapor phase portions of said flows through the packing to remove the reaction product from within said packing in accompaniment with the reflux as a countercurrent flow to said first vapor phase flow.

2. A process for producing alkoxide and alkyl products from a liquid phase alcohol and alkyl halide reactant respectively, together with solid phase metallic reactant selected from the group consisting of IA, IIA and IIIA, comprising the steps of providing a quantity of liquid phase at room temperature material selected from the group consisting of alcohols and alkyl halides vaporizable at a temperature below the melting point of the solid phase metallic reactant, forming a column packing of said solid phase metallic reactant above said liquid phase reactant and which is disposed in separated relation from said liquid phase material and is subdivided to be of a particle size providing countercurrent liquid phase and gaseous phase flows through the packing, heating said liquid phase material to develop a continuous vapor phase flow, conducting one portion of said vapor phase flow through the packing of metallic reactant from an entry location at the base of the column packing and conducting another portion of said vapor phase flow to the packing at a second location of entry with said packing at a higher vertical level than the point of entry of said one portion and dispensing the respective vapor phase flows through said packing as a function of the pressure drop across said respective locations of entry, reacting said vapor phase flows with the metallic reactant to produce a reaction product, condensing the unreacted vapor phase of said flows and refluxing such condensed flow through said packing to remove the reaction product therein.

3. A process for producing metal alkoxides comprising the steps of providing a liquid phase alcohol reactant which is vaporizable at a temperature below the melting point of the metal reactant selected from the group consisting of metals of groups IA, IIA and IIIA, forming a packing of metal reactant above said liquid phase reactant and of a size providing liquid and solid phase passage therethrough, said packing being disposed in separated relation from said liquid phase alcohol prior to its vaporization, heating said liquid phase alcohol to generate a substantially continuous flow of vapor phase alcohol reactant, separating said vapor phase flow into at least two distinct flows which are fed separately by two points of entry one above the other to the metal reactant packing at spaced locations of entry therein, condensing the unreacted vapor phase alcohol reactant from said two flows which is exposed to the metal packing reactant, refluxing the condensed alcohol through the packing to remove the alkoxide reaction product, and venting hydrogen gas formed as a byproduct of the alkoxidizing reaction between the alcohol and metal packing.

4. The process of claim 3 including a diluent combined with said alcohol and characterized by its unreactivity with said metal packing and its fluidizing action with the alkoxide reaction product to effect its removal during reflux operation.

5. A process for producing metal alkyls comprising the steps of forming a packing of solid phase metal reactant selected from the group consisting of metals of groups IA, IIA and IIIA having a particle size providing liquid and gaseous phase countercurrent flows therein, locating a quantity of liquid phase alkyl halide material below said packing and vaporizable at a temperature below the melting point of said packing, heating the liquid phase alkyl halide to generate a continuous flow of vapor phase alkyl halide by a continuous fractional vaporization thereof, separating said vapor phase flow into at least two distinct flow paths for introduction into said packing one at the base of said packing and the other at a high level of said packing for combining with the metal packing, condensing unreacted vapor phase alkyl halide from said flows and refluxing such condensed flow through the packing countercurrently to the vapor phase flow to remove the alkyl halide reaction product and salt precipitate from said packing.

6. The process in accordance with claim 5 including the steps of conducting one of said separated vapor phase flows as a bypass flow around said packing and introducing it as an inflow at the top of said packing, controllably throttling said bypass flow to effect vapor phase flow from the other separated flow upwardly through the packing and in an amount which is inversely proportional to the pressure drop between the respective points of entry of the respective flows into said packing.

7. The process of claim 6 wherein rate of formation of metal alkyl is substantially equal at each of the locations of entry of vapor phase reactant into said metal packing.

8. A process for producing metal alkyl and metal alkoxide materials comprising the steps of forming a vertical column packing of metal material selected from the group consisting of metals of groups IA, IIA, and IIIA, and having a particle size providing countercurrent solid, liquid and gaseous flows therein, locating a liquid phase reactant selected from the group comprising liquid phase alcohol and liquid alkyl halide which are vaporizable at a temperature below the melting point of said packing remotely from said packing to be in vertically separated relation therewith and vaporizable at a temperature below the melting point of said packing, heating said liquid phase reactant to generate a continuous vapor phase flow by fractional vaporization of said liquid phase, subdividing such flow into at least two branches, one entering said column at the base of said packing and the other bypassing said column for entry at the top of said packing, whereby reaction with said packing is effected simultaneously at opposite ends of said packing, throttling said bypassing flow to effect a proportion of bypass flow in direct relation to the pressure drop through said column to provide self-embodied restoration from clogging of said packing, condensing unreacted vapor phase portions of said flows, and refluxing such condensed portions through said packing to remove reaction product therein.

9. The process of claim 8 wherein said bypass flow is controllably throttled to regulate the rate of production of reaction product within said packing.

10. The process of claim 8 including the addition of a liquid phase material substantially inert to said packing and having a solvating effect on reaction product to assist in its removal from said packing during reflux action.

11. A process for producing metal alkoxide and metal alkyl products comprising the steps of separating a solid phase metal reactant selected from the group consisting of metals groups IA, IIA and IIIA formed as a packing and having a particle size providing liquid and solid phase passage therethrough and a liquid phase reactant selected from the group consisting of alcohol and alkyl halide and which is vaporizable at a temperature below the melting point of the metal packing, heating said liquid phase reactant to generate a continuous vapor phase flow by continuous fractional vaporization of said liquid phase reactant, conducting the vapor phase flow along two distinct but interconnected flow paths which are separately introduced to said packing, controllably abstracting heat from one of said flows, throttling one of said flows to regulate the relative flow rates in said respective flow paths, condensing the unreacted vapor phase flow subsequent to exposure to said packing, and refluxing said condensed flow through said packing to remove reaction product therefrom.

12. The process in accordance with claim 11 including the step of venting gaseous reaction product liberated from reaction of said solid phase metal reactant and vaporized liquid phase reactant.

References Cited in the file of this patent

UNITED STATES PATENTS 2,761,880    Gerber et al. _____ Sept. 4, 1956
2,965,663    Smith et al. _____ Dec. 20, 1960